(12) United States Patent
Lindstrom et al.

(10) Patent No.: US 7,010,384 B2
(45) Date of Patent: Mar. 7, 2006

(54) FLEXIBLE DISTRIBUTED MANUFACTURING METHOD AND SYSTEM THEREFOR

(75) Inventors: Mikko Lindstrom, South Barrington, IL (US); Mikael Haag, Desenzano del Garda (IT)

(73) Assignee: Finn-Power International, Inc., Arlington Heights, IL (US)

( * ) Notice: Subject to any disclaimer, the term of this patent is extended or adjusted under 35 U.S.C. 154(b) by 174 days.

(21) Appl. No.: 10/737,986

(22) Filed: Dec. 18, 2003

(65) Prior Publication Data

US 2005/0137740 A1 Jun. 23, 2005

(51) Int. Cl.
*G06F 19/00* (2006.01)
(52) U.S. Cl. ............... 700/169; 700/165; 700/182; 707/10; 707/104.1
(58) Field of Classification Search ........... 700/95, 700/165, 169, 182; 707/10, 104.1
See application file for complete search history.

(56) References Cited

U.S. PATENT DOCUMENTS

| | | | | |
|---|---|---|---|---|
| 4,998,206 A | * | 3/1991 | Jones et al. | 700/96 |
| 5,864,482 A | * | 1/1999 | Hazama et al. | 700/95 |
| 6,219,586 B1 | * | 4/2001 | Sakai | 700/182 |
| 6,539,399 B1 | * | 3/2003 | Hazama et al. | 707/104.1 |

* cited by examiner

Primary Examiner—Jayprakash N. Gandhi
Assistant Examiner—Douglas S. Lee
(74) Attorney, Agent, or Firm—Louis Woo (57) ABSTRACT

In a manufacturing system that has a plurality of sheet fabrication machines, to enhance the efficiency of the system, there are provided a plurality of databases each for storing particular data relating to the machines, the types of materials to be used, the tooling of the machines, etc. of the system. When a multi-dimensional model of a component part to be produced by the system is input to the system, selective data is retrieved from the various databases so that at least one machine of the plurality of machines of the system is selected to produce the part from a worksheet of a chosen material. Concurrently, or shortly thereafter, a NC part program for programming the selected machine to execute the necessary operations in accordance with a flat drawing generated from the multi-dimensional model to fabricate the component part is generated based on selective data retrieved from the databases. With the NC part program, the selected machine performs the operations necessary for producing the component part from the sheet stock material chosen for the component part. If there are multiple component parts to be produced in the same production run, the system would sort the different parts and arrange for the ordered fabrication of the different parts by respective selected machines equipped with corresponding appropriate NC programs to eliminate any potential bottleneck or conflicts that may arise due to the fabrication of multiple parts by multiple machines during the same production run.

23 Claims, 5 Drawing Sheets

SAMPLE SELECTION OF PROCESS MACHINES

| MACHINE | TYPE | SUITABLE | AVAILABLE | TOOLING AVAILABLE | MATERIAL CAPACITY |
|---------|------|----------|-----------|-------------------|-------------------|
| 1 | Turret Punch | No | - | Yes | Yes |
| 2 | Punch Shear | No | - | No | Yes |
| 3 | Laser | Yes | No | Yes | Yes |
| 4 | Laser Punch | Yes | Yes | Yes | Yes |
| 5 | E Press Brake | Yes | Yes | Yes | Yes |
| 6 | H Press Brake | No | - | Yes | Yes |
| 7 | Bender | No | - | No | Yes |

Selected laser and electric press brake
- Laser since laser/punch is full of other work no capacity left
- Electric press brake suitable due to high accuracy capability

FIG. 5

FLEXIBLE DISTRIBUTED MANUFACTURING METHOD AND SYSTEM THEREFOR

FIELD OF THE INVENTION

The present invention relates to sheet metal manufacturing and particularly to a flexible distributed manufacturing method, and system therefor, that selects from among a plurality of machines of a distributed sheet metal manufacturing system one that is adaptable to fabricate a part at a particular time from an input order, with the ordered part being represented by a multidimensional model or drawing.

BACKGROUND OF THE INVENTION

In the current sheet metal manufacturing environment, flat metal parts are produced by individual sheet fabrication machines such as for example punch presses, laser cutters, and/or combinations thereof. For bending, the flat metal pieces are bent by machines such as benders, press brakes and automatic panel bending machines, etc. With the advance of the CNC (Computer Numerical Controlled) technology, all of these individual machines can be programmed to perform the tasks with which the machines are designed for. For example, a punch press could be programmed for punching operations, a cutter may be programmed for cutting operations, whereas a bender could be programmed for bending operations. The program for operating each of these machines is made with particular softwares that are dedicated for the particular types of machines. For example, flat metal parts are produced from turret punch presses and laser cutters, whereas parts that require bending are produced by bending machines that could bend a flat part to a desired shape according to the model for the part formulated by the design engineer.

The designing process of components that are to be manufactured from sheet metal is accomplished in the current manufacturing environment with various CAD (Computer Aided Design) systems. These CAD system may be both 3-dimensional or 2-dimensional, although most of the designs are now made in 3-D environment due to advantages such 3-D CAD system provide to the design engineers.

In a typical manufacturing process, a routing order for the part(s) is generated. The routing order indicates what machines are to be used and in what sequence these machines are to be used for making a particular component part or the component parts. With the routing order, the manufacturing time is also estimated in order to establish a reasonable start time to begin the processing so as to meet the requested final delivery time. Once a particular machine or machines are determined necessary for producing a part, the CNC programmer would either receive a "flat drawing" of the to be produced component part, or the flat drawing is produced from the available 3-D drawing. Thereafter, a program for producing the part using the machine(s) is generated. If a part needs to be bent, then a bending program for a particular bending machine would also be generated.

Currently, there are several problems that are created when a flat drawing is produced. First, to be able to generate a correct flat drawing, the programmer must know exactly the tooling and the material, as well as the material thickness, and the machines that are to be used for fabricating the part, be that part a flat part or a bent part. The dimensions of the flat part are critical, and are even more so if the produced flat part is to be finalized into a bent component that needs to adhere to precise engineering dimensions. Oftentimes, the produced part has dimensions that fall outside of the engineered dimensions. More often, multiple iterations are required to make the flat part conform to the bend allowances that are required by the type of material used, and the machinery that is used to manufacture the component. And if the dimensions of a component are critical, or if the component has multiple bends at different directions, the generation of a correct flat drawing in a conventional manufacturing environment becomes quite difficult, as an accurate flat drawing requires information based on the tooling, the material, and the machine, etc. in-combination. There is also the matter of trying to generate a flat drawing from a multi-dimensional model or drawing, such as a 3-D model or drawing.

Furthermore, in today's manufacturing shops, it is quite often that the required information is stored in different locations. Sometimes the information consists of notes of the programmer and is dependent on the experience of the programer. Once a flat drawing is generated for a manufacturing process, the manufacturing process is "locked" to that flat drawing and therefore does not allow any flexibility during the manufacturing process. This inflexibility limits the capability and capacity of the manufacturer to produce parts that may well be different in short time and in small quantities.

A further problem arises due to engineering changes that may be required during the manufacture process. In a conventional system where a flat drawing has been generated from an input multi-dimensional drawing, any changes would require the modification of the dimensions of the flat drawing, relative to the different equipment or machines that have been selected for manufacturing the part in accordance with the flat drawing. Given that there is very little, if at all any, feedback between the manufacturing engineering drawings and the design engineering drawings, or models, oftentimes there will be one set of drawings on how the part is to be manufactured and another set of drawings on how the part will look like. Needless to say, such double engineering wastes numerous valuable man hours.

Currently, there are some instances where it is possible to process a finished component from an input multidimensional drawing. These instances require that the manufacturing process be made in a dedicated line of machines, such as the Finn-Power SG punch/shear system and EB panel bending system. However, the dedicated manufacturing systems are limited to handling processes in a rigid environment. That is, for such systems, the process is locked to the particular equipment, and alternate methods of manufacturing cannot be used automatically. For example, if one of the dedicated machines such as a punch press were to breakdown, then in order to route the manufacturing process that would have been performed by the broken down punch press to a laser machine that can do the same work, a new flat drawing, as well as a new program for the laser cutter, have to be generated.

SUMMARY OF THE PRESENT INVENTION

To enable a multiple machine manufacturing system to manufacture a part using a selected machine that is capable of and available for manufacturing the part at a desired production time, a multiple number of databases for storing the various data germane to the operation of the various machines of the system are provided. These databases may all be a part of a central memory, or may be a part of multiple memories each having stored therein a given database. Each of the databases may have stored therein the data that is relevant to a given machine, or alternatively particular types of data that are used by all of the machines of the system.

In a first embodiment, tooling rules for the various machines are stored as tooling data in one of the databases. Production rules under which the various machines operate are stored as production data in another one of the databases. In those instances where the system includes bending machines, the bending rules for the bending machines are stored as bending data in yet another one of the databases. Additional data such as for example the types of materials to be used and the time it takes for a particular machine to fabricate a given material stock may also be stored as material stock data and machine capability data, respectively, in different databases. There may also be stored in yet another database the availability of the various machines for different types of operations as availability data.

The inventive distributed flexible manufacturing system further has a central processor to which each of the machines is connected. Alternatively, each of the CNC processors of the respective machines may act as a central processor, provided that the various machines are interconnected, so that the different CNC processors may be prioritized for performing the overall processing of the system. A memory to which the various databases may be stored is connected to the central processor. In place of a central memory, corresponding memories may be provided at each of the various machines to stored the relevant databases for those machines.

When an order is placed for producing a component or part from a 3-D model, to determine the machine(s) to be used for producing the component part, various data are retrieved from the different databases and correlated to determine the requirements for the production of the component part and to select the most appropriate machine or machines for fabricating the component part. Once the data is completely analyzed, the machine that is selected would be the one that is capable of performing the operation for producing the component part and is available at the particular production time to work on the worksheet to produce the component part. Selective data is further retrieved from the various databases for generating from the input multi-dimensional model a flat drawing that is usable by the selected machine for fabricating the component part at the particular production time.

In those instances where multiple parts are to be produced by different operations, and therefore different machines of the system, the various operations are separated out and the relevant data from the various databases are retrieved for each of the operations so that the appropriate machines may be selected for the different operations that are required for fabricating the different input parts. Different flat drawings each for a given machine are generated from selective data retrieved for each of the operations. As a consequence, even when multiple orders for fabrication of multiple parts are input to the inventive distributed system, bottlenecks and conflicts that may result from the operation of the various machines for fabricating the various parts with different operations are prevented.

The present invention therefore relates to a system having a plurality of machines each adapted to perform a given type of operation using a particular tool in which a part is produced by using one of the machines. The operation of the present invention system is defined by the steps of establishing a plurality of databases, storing in different ones of the plurality of databases respective types of data for the different machines, retrieving from the plurality of databases data relating to the various machines, correlating the data retrieved from the databases with the requirements for fabricating the part to select from the various machines a selected one machine for producing the part, and utilizing selective data from the databases for generating from an input multi-dimensional model or drawing a flat drawing for use by the selected machine for fabricating the part.

Another embodiment of the instant invention relates to a method of selecting one of the machines for producing a part in accordance with a multi-dimensional model input to a system having a plurality of machines each having at least one tool for performing one type of production work on a worksheet. The method of the embodiment includes the steps of storing the respective tooling rules for the various machines as tooling data, storing the respective production rules for the machines as production data, storing the respective bending rules for the bending machines as bending data, storing the respective available capacities of the machines as capacity data, correlating the tooling rules, production rules, bending rules and available capacities of the machines to select at least one machine for fabricating the part, and generating a flat drawing for the part from the input multi-dimensional model for use by the selected machine for producing the part.

The inventive system therefore includes a plurality of machines each having at least one tool for performing at least one type of production work, a memory means for storing the tooling rules, production rules and available capacities of the machines as respective tooling data, production data and capacity data. Also included in the inventive system are interface means for receiving a multi-dimensional input model that is representative of a part to be produced by the system, and processing means for correlating the respective tooling data, production data and capacity data to select one of the machines that is capable of and available for fabricating the part at a desired production time. A flat drawing generated from the input multi-dimensional model is used by the selected machine to produce the part.

BRIEF DESCRIPTION OF THE FIGURES

The invention is best understood by reference to the following description taken in conjunction with the accompanying drawings, wherein.

DETAILED DESCRIPTION OF THE INVENTION

Figure 1:
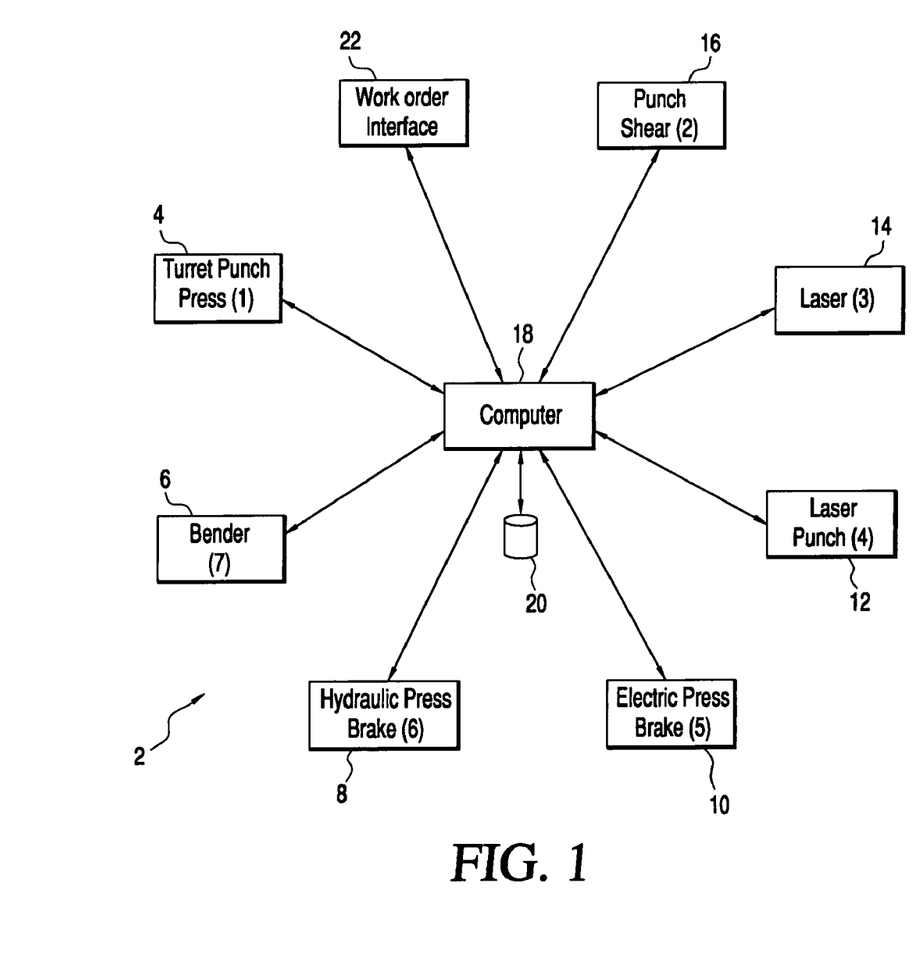
FIG. 1 is an illustration of the inventive system in which a plurality of machines are interconnected via a central controller.

A distributed flexible manufacturing system is illustrated in FIG. 1. As shown, the exemplar manufacturing system 2 includes a turret punch press 4, a bender machine 6, a hydraulic press brake 8, an electric press brake 10, a laser punch 12, a laser cutter 14 and a punch shear 16. Each of those machines is connected to a central processing computer 18. It should be noted that computer 18 may in fact be representative of the individual CNC controllers or any one of the CNC controllers resident in each of the sheet fabrication machines of the FIG. 1 embodiment.

Connected to computer 18 is a memory 20. Memory 20, instead of being a central memory, may also be representative of the individual memory resident in each of the sheet fabrication machines that functions with the resident CNC controller in those machines. A work order interface 22 is also connected to computer 18 for receiving input orders for the fabrication of worksheets. Such interface may include conventional readers, scanners, keyboards, CD Rom readers, and other inputting devices that allow a user to input to the system an order that includes either a multi-dimensional model or drawing of the component to be manufactured by a selected machine or machines of the system. Like computer 18 and memory 20, work order interface 22 may also be a part of one or more of the machines of the system.

The one thing that should be appreciated with respect to the FIG. 1 exemplar embodiment is that each of the sheet fabrication machines is interconnected so that even though the machines may well be distributed over the manufacturing floor of the plant or shop, or indeed be at different locations, the respective operations of the different machines are in fact coordinated. For discussion purposes, it is assumed that all of these machines are located at the same location and that the worksheets of stock materials that are to be fabricated may be conveyed by conveyors and other means to each of the machines, or from one machine to the next throughout the system.

The instant invention brings flexibility to the manufacture of small series of different parts in an automatic environment with short lead time by taking the information, input for example directly from a 3-D CAD system, based on the manufacturing data relating to the order with the equipment that is best suited and available at the particular production time for producing the parts. The 3-D CAD system may be a part of the work order interface 22 shown in FIG. 1.

In consideration of the availability of the various machines or equipment, realtime information of the particular tooling and the setup availability of the manufacturing equipment, which are major criteria for producing a component part that meets the required dimensions, are needed. The distributed manufacturing system of the instant invention would produce the program(s) for the manufacture of an ordered component part when all data relating to the fabrication of that component part is known. This ensures that both manufacturing engineering and design engineering have the same information. In other words, the inventive system ensures that the part schematic upon which the machines of the system would follow for manufacturing the component part would be the same as the design information.

To achieve this end, real time processing of the manufacturing information from the different databases for generating a "flat drawing" or schematic, which lays out the dimensions of the part to be produced in a flat geometry, is utilized. From the generated flat geometry, the proper CNC program may be generated for the machine that is selected for fabricating the ordered part, the machine being selected based on its availability at the particular production time when the part is to be produced. Other exemplar criteria for selecting the appropriate machine for producing the part include the machine's capability for working with the material from which the part is to be produced, the compatibility of the tooling of the machine for the part and the capability of the machine to perform the particular operations which are required for producing the part from the sheet stock. There may well be a number of alternative machines that may be available and capable of producing an ordered part.

Figure 2:
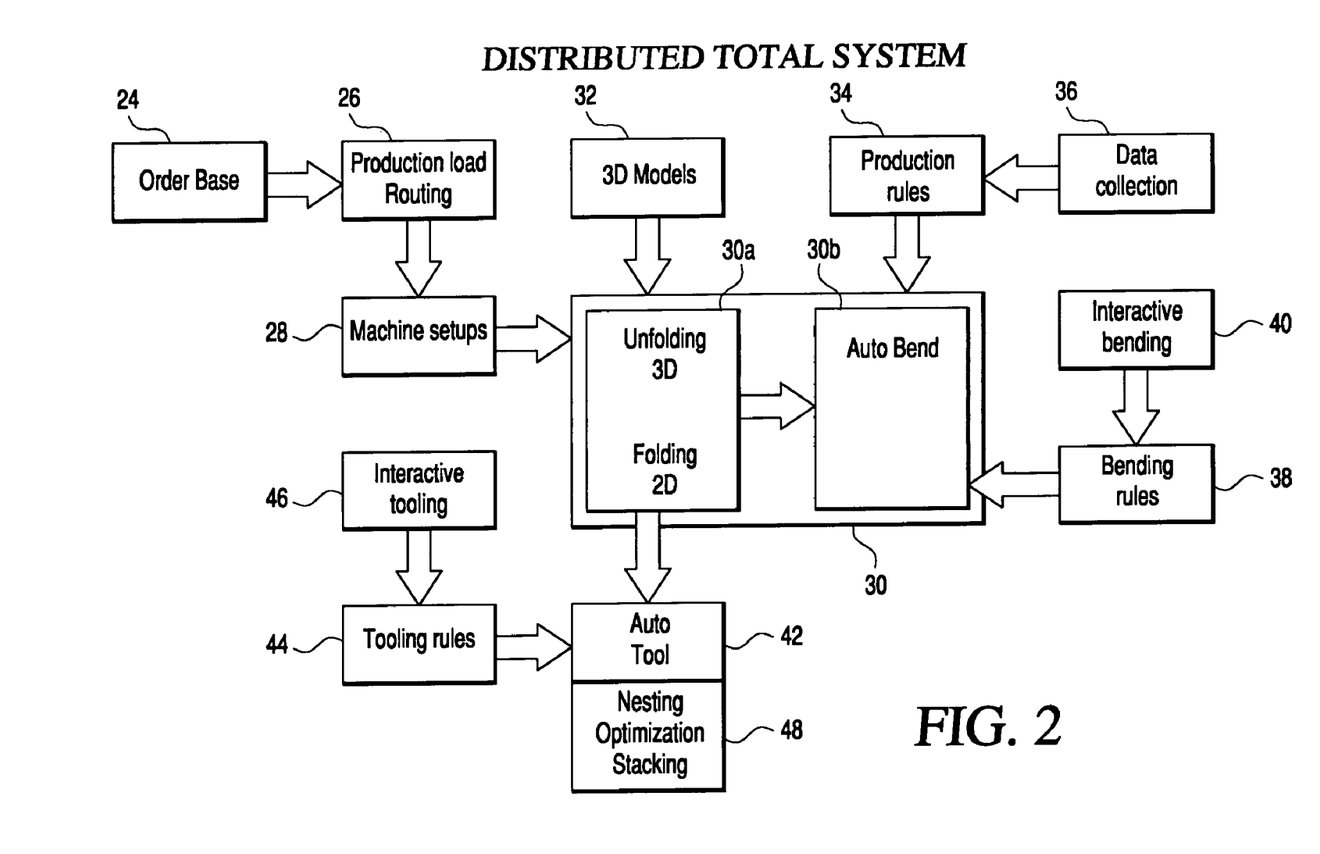
FIG. 2 is an overall block diagram illustrating the different functions and rules for the inventive distributed system.

FIG. 2 is a block diagram illustrating the various rules and data that are provided to the distributed system of the instant invention and which are used for determining the most appropriate machine(s) to be used for fabricating an ordered part. In particular, for the inventive system, different types of data are collected and disseminated during the manufacturing process, in response to the input of an order. As shown in FIG. 2, the system of the instant invention has an order database 24 in which the given order of the various machines of the system is stored. With the ordered base of the various machines established, when a component is to be manufactured by the system, the routing of the sheet stock from which the component is to be produced may be determined from the order database 24 by a production load routing processor program, designated by module 26. If the order contains a multiple number of parts, the most efficient way in which those parts are to be manufactured vis-a-vis the conveying of multiple worksheets of different stock materials are determined by the production load routing process 26. Depending on the routing of the production load, the set-up of the various machines may be effected by way of the machines set-ups module or program 28. The process of setting up the various machines is input to module 30, which is the execution program module into which various data are provided, so that an appropriate flat drawing may be output to the appropriate machine of the system to produce the ordered part at the appropriate time during the production run.

Also being input to execution module 30 is a 3-D model from module 32. Module 32 may be representative of a 3-D CAD system that inputs 3-D models of component parts that are to be manufactured by the system of the instant invention. Alternatively, module 32 may represent the 3-D modules or drawings that are input to an interface such as work order interface 22 shown in FIG. 1, which routes the input 3-D model information to the execution module 30. Once received, the 3-D model of the component part is unfolded and converted into a flat drawing showing a two dimensional schematic of the 3-D model component. This is done in sub-module 30A of execution module 30. The flat drawing, most conventionally generated in the form of a file, may be sent to an auto bend process sub-module 30B of execution module 30 in the event that the production of the part requires bending.

Also provided to execution module 30 are production rules for the various machines, per production rules module 34. To generate the production rules for the various machines, data is collected, either by empirical studies or machine manufacturing data, from the various machines, per module 36. The collected data is input to the production rules module 34 wherein the various production rules for the different machines of the system are formulated, and output to execution module 30. There is also provided to execution module 30, particularly its auto bend sub-module 30B, the rules for the bending machines to operate, per bending rules module 38. The bending rules are established by the collection of data from bending processes that are performed by the various bending machines, such as automatic benders, press brakes and panel bending machines etc. The data relating to the bending processes for the different bending machines is collected and stored in interactive bending module 40, and is output thereby to the bending rules module 38.

Based on the information or data relating to the machine set-ups, the production rules and the bending rules, the execution module 30 is able to output the appropriate information to the various machines so as to guide the respective operations of those machines with respect to the tools which those machines are respectively capable of operating, per auto tool module 42. The operation of a particular tool in a given machine is further dictated by the tooling rules of the tool for that machine, per the data input to the auto tool module 42 by the tooling rules module 44. The tooling rules are established from the empirical studies relating to how the respective tools of the different machines interact. Such interactive tooling data is collected in interactive tooling module 46 and routed to tooling rules module 44 for use by the auto tool module 42, per the operational processing of the tool provided by execution module 30.

Integrated to the auto tool module 42 is a nesting optimization stacking module 48 which in essence optimizes the order and fabrication of different parts when there are to be multiple parts produced from either a single order or multiple orders by means of different machines of the system. The nest program of module 48 sorts the parts to be manufactured and the handing of those parts optimally, so that no bottleneck or conflicts would arise during the manufacture of the various parts in the production run. This is particularly useful insofar as the manufactured lot sizes are getting smaller, and less time could be spent for material handling. The nesting optimization stacking module optimizes the material utilization in light of the availability of the various machines in the system and the processing steps of the different parts from one machine, and/or process, to another.

Figure 3:
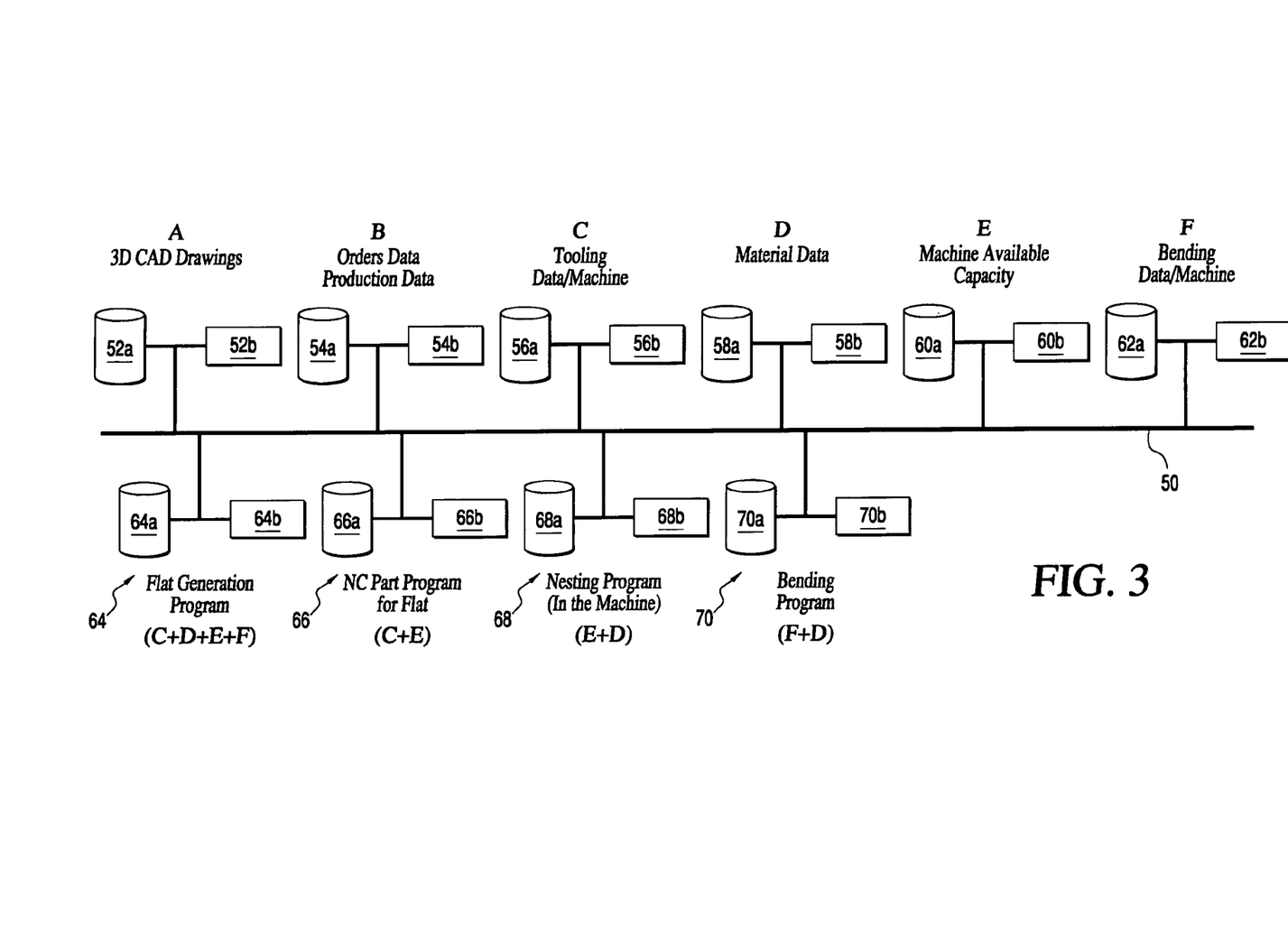
FIG. 3 is a network layout of the various exemplar machines and programs of the inventive distributed manufacturing system.

An exemplar "network layout" of the various databases and the programs generated from the databases is shown in FIG. 3. In particular, the various databases and programs are connected by a central link or bus 50. Connected to central bus 50 is a memory 52a acting as a database for storing 3-D CAD models or drawings. Database 52a may be connected to a processor 52b. Also connected to bus 50 is a memory 54a, and its processor 54b, for storing the orders for manufacturing component parts input by the customers to the system of the instant invention. These orders may be stored as data in the database of memory 54a. Note that the production rules are stored as production data and may be part of the data that is stored in the database, or another database, established in memory 54a. Memory 56a, and its processor 56b, are also connected to bus 50. The database in memory 56a is used to store the data which is representative of the tooling rules for the tools of the various machines, and how those tools are operated by the various machines. The material stocks, or worksheets, are stored as material data in a database in memory 58a. Memory 58a and its processor 58b are also connected to bus 50. The availability of each of the machines, as well as the respective capacities of those machines are stored as machine capacity data and machine availability data in the database of memory 60a. Memory 60a and its processor 60b are also connected to bus 50. Also connected to bus 50 is a memory 62a and its processor 62b. Stored in memory 62a is at least one database for storing the bending data, which is representative of the bending rules for the different types of bending machines, such as the automatic bender, press brake, etc., that may form part of a distributed manufacturing system. Although shown as separate memories, the different databases may in actuality be established in a central memory store such as 20 shown in FIG. 1, with the memory containing a number of separate databases.

From the different data provided by the various databases, the appropriate programs may be generated for the system of the instant invention for fabricating ordered component parts from sheet stocks. As shown in FIG. 3, the processor of the distributed manufacturing system, be it a central processor or otherwise, may generate a flat drawing by retrieving from the databases 56a, 58a, 60a and 62a data that enables the processor to generate a flat drawing from a 3-dimensional model or drawing. For explanation purposes, the respective data retrieved from the different databases are represented by C, D, E and F for the flat drawing generation program 64, which is represented in FIG. 3 by memory 64a and processor 64b. In receipt of a 3-D model or drawing such as that stored in memory 52a, the flat drawing generation program would retrieve the appropriate data relating to the different machines and their respective toolings, the material data, the machine availability and capacity data as well as any bending data, if bending processes are involved, for generating a flat drawing that represents the 3-dimensional model, and which is needed for the machines to fabricate the component part per the requirements and/or dimensions set forth by the 3-D model.

Once the flat drawing is generated, it is fed to the processor by bus 50. In the meantime, the system would proceed to select the most appropriate machine, or machines, of the system that would be most appropriate for fabricating the component part from the flat drawing. Given the selection of the machine(s), the processor of the system proceeds to generate an execution program(s) that is/are provided the selected machine(s) for instructing that machine(s) to perform the appropriate operations to fabricate the component part from the worksheet. This is done by the NC part program 66, which is represented by memory 66a and processor 66b. To generate the NC part execution program, the data that is selected from the various databases at least includes the tooling and machine data stored in database 56a (C) and the machine availability and capacity data that is stored in the database 60a (E).

In the event that multiple component parts are to be produced from either a single input order or multiple orders where various machines of the system would be operating at the same time, to prevent bottlenecks and conflicts that may occur to the flow and/or fabrication of the parts during the production run, a nesting program (which may include de-nesting programming), designated 68, is provided for sorting the ordered component parts into a particular order of operations by the selected machine(s), so that the different ordered parts may be prioritized and produced sequentially, instead of potentially concurrently, by each of selected machines so as to avoid any potential conflicts in the operation of the different machines. As represented by memory 68a and processor 68b, the nesting program takes into consideration the machine availability and machine capacity data (E) from database 60a and the data of the stock material (D), which is stored in database 58a.

In the event that bending processes are required for the fabrication of the component part so that a bending machine, be it an automatic bender or a press brake, is required for producing the component part, then the bending program for the system, designated 70 and represented by memory 70a and 70b, would generate a bending execution program for the selected bending machine to fabricate the component part from the stock material. For the bending program, bending data for the selected bending machine is retrieved from database 62a (F). In addition, data relating to the availability of the bending machine and its capacity is retrieved from database 60a (D). From the selectively retrieved data, a program designed particularly for the selected bending machine for fabricating the particular component part or parts is generated. It should be noted that each of the programs shown in FIG. 3 and discussed above would be used by a selected machine at a particular time during the production run.

Figure 4:
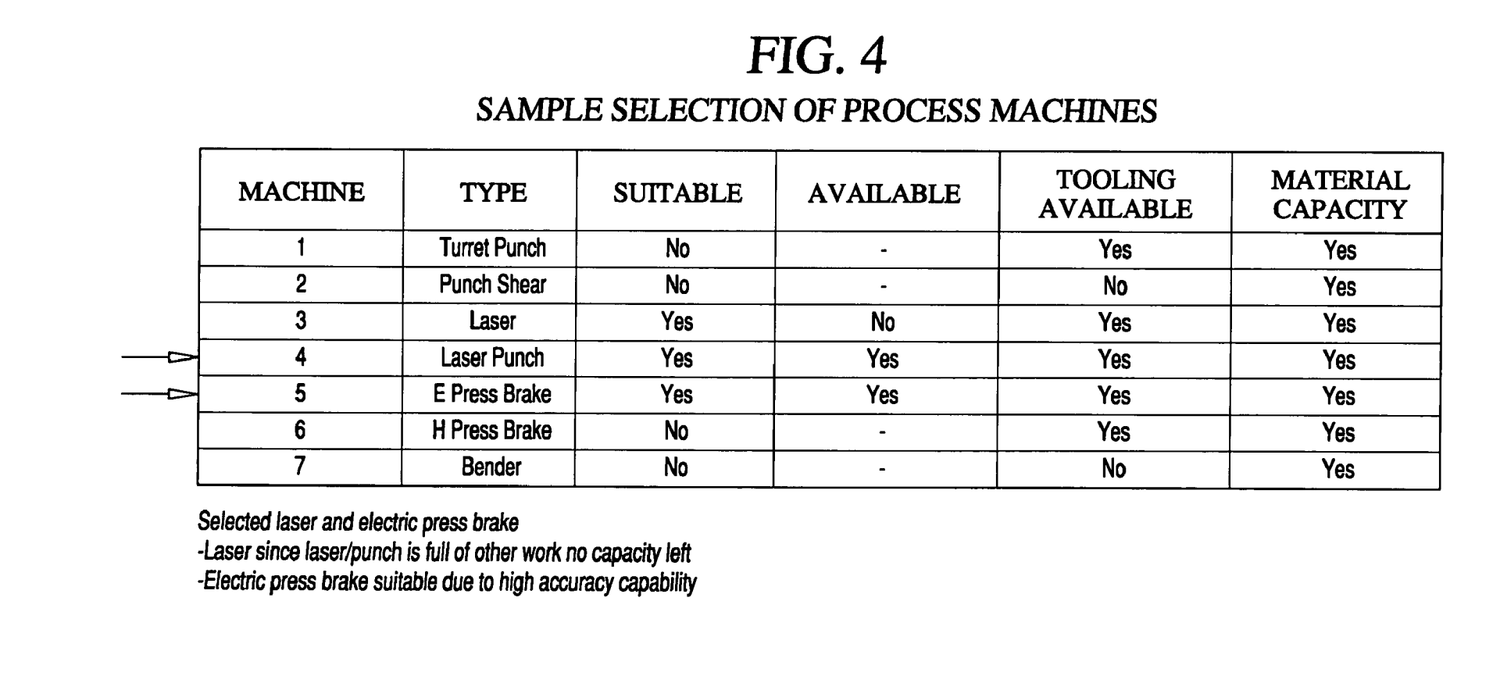
FIG. 4 is a sample illustration of selecting one of the exemplar machines of the manufacturing system for fabricating an ordered component part.

An example of the selection of a particular machine or machines for the fabrication of a component part is discussed herein with reference to FIG. 4. As shown, there are 7 sheet fabrication machines in the exemplar system. These machines are reflected in FIG. 1 and include a turret punch press, a punch shear machine, a laser machine, a laser punch machine, an electric press brake, a hydraulic press brake, and an automatic bender.

Assume that a component part ordered by a customer and input to a work order interface 22 by either a 3-D CAD system directly or an input file requires certain particular operations, including for example a semi-circular cut and a bending operation. Under the column "Suitable" in FIG. 4, note that the only machines that are capable of generating the particular flat cut required for producing the part are the laser machine (3) and the laser punch machine (4). For the bending operation needed to fabricate the component part, an electric press brake (5) is required. Further with reference to FIG. 4 under the "Available" column, note that for the example system, the laser machine is not available at the time that the part needs to be fabricated. Accordingly, the only available machine left is the laser punch machine for effecting the cut. For the FIG. 4 example, the electric press brake is also available for operating on the worksheet to produce the ordered part. From the "Tooling Available" column, it can be seen that both the laser punch machine and the electric press brake machine each have tools that are available and appropriate for working on the stock material to fabricate the part. Moreover, under the "Material Capacity" column, note that all of the machines of the system would have been capable of doing work on the type of material from which the ordered part is to be fabricated. In sum, for the FIG. 4 example, the machines that are selected for fabricating the ordered part from a worksheet of a particular type of stock material are the laser punch machine and the electric press brake machine. As noted by the footnotes in FIG. 4, the laser machine is not available since its work capacity is full and the electric press brake is required since it can do a more accurate job than the hydraulic press brake. Evidently the ordered component part requires more accurate dimensional cuts than what the hydraulic press brake of the system could do.

Figure 5:
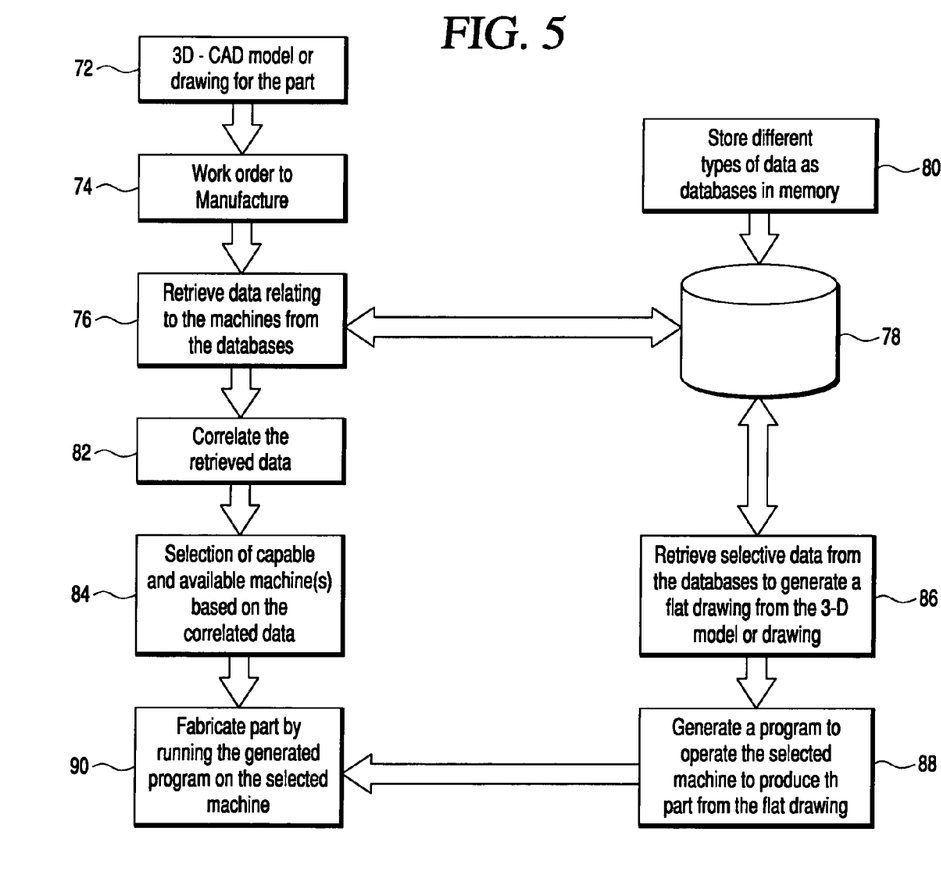
FIG. 5 is a flow diagram illustrating the operation of the system.

With reference to the flow chart of FIG. 5, the operation of the system is discussed herein. As shown, a 3-D CAD model of the part that is desired is input to the system, per step 72. As was noted, the 3-D model of the product to be produced may be input directly from the 3-D CAD system as a file, or a 3-D drawing may be produced and, if available, input to a scanner of the system. The dimensions of the ordered part are taken into consideration and a work order is submitted by the customer to the system for manufacture, per work order step 74. Upon receipt of the work order, which includes the 3-D model, and the dimensions and particular requirements for the part to be manufactured therefrom, the appropriate data relating to the different machines such as those stored in the databases shown in FIG. 3 is retrieved per step 76.

As further shown in FIG. 5, the data may be stored in a single central memory 78 which has stored therein multiple databases each for storing a particular type of data relating to either all of the machines or an individual machine. Insofar as the bending operations are different from the non-bending operations, the data relating to bending machines and those relating to non-bending machines are separately stored in different databases. Further, given that there are a number of different types of non-bending machines and a number of different bending machines, the respective databases may further be subdivided for storing data relating specifically to the different types of bending machines and non-bending machines. The storage of the different types of data in the different databases in memory is represented by step 80.

Once the appropriate types of data are retrieved from the databases in memory 78 per step 76, the retrieved data are correlated per step 82. This correlation of data may include also the requirements that are set forth in the order for the component part. As was discussed above, some of the retrieved data may include the tooling data, the production data, the bending data, the capacity data and the availability data for the machines. These data represent rules and specifications that are set forth for the operations of the different machines and the routing of the stock material to the various machines during the production run.

Once the retrieved data has been correlated, based on the result of the correlation, the most capable and available machine or machines for fabricating the worksheet to produce the component part is/are selected. Either during the time that the appropriate machines are selected or shortly thereafter, selective data is retrieved from the databases to generate a flat drawing from the three-dimensional model or drawing, per step 86. From the flat drawing of the component part to be produced, a program such as the NC part program 66 shown in FIG. 3 is generated for the selected machine for fabricating the part from the stock material chosen for the part, per step 88. If there are a number of machines required for fabricating the part, per for example the FIG. 4 embodiment, then a similar number of part programs may have to be generated, with each part program being generated in particular for a given one of the selected machines to perform specific operations for fabricating the parts from the stock material or worksheet.

With the appropriate program supplied to the selected machine, the part may then be fabricated by the selected machine, per step 90. Although not shown, the operational steps of FIG. 5 may be repeated if there are multiple parts to be produced for each order, or for multiple orders.

Per the instant invention, the potential additional set-up required in the prior art system are eliminated, so that there is no duplication of any engineering designs that were done in the prior art systems that have multiple sheet fabrication machines. For the instant invention system, at a moment's notice a flat drawing of a component part may be generated and an appropriate machine for fabricating the part in accordance with the flat drawing may be selected and operationally programmed by a program that is generated specifically for the selected machine to fabricate the particular component part as represented by the flat drawing. Further, given the ability to generate a nesting program, such as 68 shown in FIG. 3, the present invention system is also capable of sorting through multiple orders or a single order of multiple component parts so that the fabrication of the ordered component parts may be done in a non-conflicting manner by the different machines of the system in an orderly fashion with great efficiency. Furthermore, insofar as the respective data relating to the machines, the tooling of the machines, the material of the stocks, etc, are updated constantly due to the change in tools for the different machines, the worksheets and the status of the machines, etc., the databases would always contain fresh data that enhances the respective operations of the machines of the system so as to further increase efficiency of the sheet fabrication system and cut down on the cost of duplicate and sometimes triplicate design drawings or changes for the same component part.

Even though a number of rules and types of data are given above, it should be appreciated that additional rules and types of data for a distributed manufacturing system may be added, as the system may acquire additional machines, tools or different types of machines. Furthermore, different types of data may be deemed to be more important than others during particular processing and operations of particular component parts in particular production runs.

The invention claimed is:

1. In a system having a plurality of machines each adapted to perform a given type of operation using a particular tool, a method of producing a part from an order by using one of the machines, comprising the steps of:
   a) establishing a plurality of databases;
   b) storing in different ones of said plurality of databases respective types of data for said plurality of machines;
   c) retrieving from said plurality of databases data relating to said plurality of machines;
   d) correlating the data retrieved from said databases with the requirements for fabricating said part to select at least one of said plurality of machines for producing said part from said order at a given time; and
   e) utilizing selective data retrieved from said databases for generating a schematic of said part for use by said selected one machine to fabricate said part at said given time.

2. Method of claim 1, further comprising the steps of:
   separating data relating to bending operations performed by bending machines from data relating to non-bending operations performed by non-bending machines; and
   storing bending operation data and non-bending operation data in separate databases.

3. Method of claim 1, further comprising the step of:
   generating an execution program to be used by said selected one machine to perform the required operations to produce said part from a worksheet for use in fabricating said part.

4. Method of claim 1, wherein said step b comprises the step of:
   storing to corresponding ones of said databases at least production data and tooling data for each of the machines, the type of material stock able to be handled by each of the machines, and the operational capacity of each of the machines.

5. Method of claim 1, wherein said step d further comprises the step of:
   determining the compatibility of each of said plurality of machines for working on the type of material stock to be used for said part.

6. Method of claim 1, wherein said step d further comprises the steps of:
   determining the capability of each of said plurality of machines to fabricate said part;
   determining the availability of each of said selected machines for fabricating said part; and
   selecting only those machines from said plurality of machines that have the capability to fabricate said part and that are available to fabricate said part at the time said part is to be fabricated.

7. Method of claim 1, wherein said step d comprises the steps of:
   determining the time it takes to fabricate said part for each of the machines that is capable of fabricating said part from a material stock chosen for said part; and
   comparing the respective times for fabricating said part for the machines determined to be capable of fabricating said part; and
   selecting the machine that has the most efficient fabrication time that is available to work on said part at the time when said part is to be produced.

8. Method of claim 1, wherein said step e comprises the steps of:
   retrieving data relating to the tooling and the operational requirements and the precision with which said part is fabricated by said selected one machine; and
   generating said schematic of said part with dimensions and tolerances for said selected one machine to fabricate from a sheet of material stock.

9. Method of claim 1, wherein multiple parts from one or multiple orders are received by said system, the method further comprising the step of:
   utilizing selective data from said databases to arrange the fabrication of the multiple parts from the one or multiple orders by respective selected machines in an orderly fashion to eliminate any bottleneck or conflicts resulting from the fabrication of multiple parts by multiple machines.

10. Method of claim 1, further comprising the step of:
    inputting said order for said part as a multi-dimensional model or drawing.

11. In a system having a plurality of machines each having at least one tool for performing one type of production work on a worksheet, a method of selecting one of said machines for producing a part in accordance with a multi-dimensional model, comprising the steps of:
    a) storing respective tooling rules for said machines as tooling data;
    b) storing respective production rules for said machines as production data;
    c) storing respective bending rules for bending machines of said plurality of machines as bending data;
    d) storing respective available capacities of said machines as capacity data;
    e) correlating the respective tooling rules, production rules, bending rules and available capacities of said machines to select at least one machine from said plurality of machines capable of fabricating said part; and
    f) generating a schematic for said part from said multi-dimensional model for use by said selected one machine to produce said part from a worksheet.

12. Method of claim 11, further comprising the step of:
    storing information relating to material stocks for worksheets to be used in production runs as material stock data;
    wherein said part is produced from the stock material required for said part; and
    wherein said selected one machine is capable of fabricating parts from said stock material.

13. Method of claim 11, further comprising the steps of:
    forming databases from at least one memory store;
    storing said respective tooling data, production data, bending data and capacity data in corresponding ones of said databases; and
    interconnecting said memory store to said plurality of machines via either a central processor or the respective process controllers in said plurality of machines.

14. Method of claim 11, further comprising the step of:
    generating an execution program for use by said selected one machine to control the operational steps of said one machine to produce said part from said worksheet.

15. Method of claim 11, further comprising the steps of:
    receiving multiple parts from multiple orders for fabrication by said system; and correlating the respective rules and data from said databases with the multiple orders to arrange the multiple parts from the multiple orders to be fabricated by respective ones of said plurality of machines in an orderly fashion to eliminate any bottleneck or conflicts due to the fabrication of the multiple parts from the multiple orders by said plurality of machines.

16. Method of claim 11, further comprising the steps of:
determining if said part requires bending; and
generating a bending execution program for use by said selected one machine if the production of said part is determined to require bending processes, said bending execution program generated in particular for a specific type of bending machine that performs a given type of bending operation.

17. A system comprising:
a plurality of machines each having at least one tool for performing at least one type of production work;
memory means for storing
respective tooling rules for said machines as tooling data;
respective production rules for said machines as production data;
respective available capacities of said machines as capacity data;
interface means for receiving a multi-dimensional model representative of a part to be produced by said system; and
processor means for correlating the respective tooling data, production data and capacity data of said machines to select at least one machine from said plurality of machines capable of and available for fabricating said part at a desired production time, said processor means relying on the result of its correlating process to generate a schematic for said part from said multi-dimensional model for use by said selected one machine to produce said part from a worksheet at said desired production time.

18. System of claim 17, wherein said memory means further stores respective bending rules for bending machines of said plurality of machines as bending data;
wherein said processor means correlates said bending data with said tooling, production and capacity data for selecting a bending machine from among said plurality of machines to fabricate said part if bending is required for fabricating said part.

19. System of claim 17, wherein said memory means further stores information relating to material stocks for worksheets to be used in production runs as material stock data, said part being produced from a worksheet of a material stock chosen for said part, said one machine selected for fabricating said part being capable of working on the type of material stock from which said part is to be fabricated.

20. System of claim 17, wherein said plurality of machines, said memory means, said interface means and said processor means are communicatively interconnected.

21. System of claim 19, wherein said memory means comprises at least one memory store for storing said tooling data, said production data, said bending data and said material stock data as respective databases.

22. System of claim 19, wherein said memory means comprises a plurality of memory stores each for storing a database of said tooling data, said production data, said bending data and said material stock data.

23. System of claim 17, wherein said processor means comprises a central processor interconnected to said plurality of machines.

* * * * *